(12) United States Patent
Harada et al.

(10) Patent No.: US 6,578,911 B2
(45) Date of Patent: Jun. 17, 2003

(54) SEAT PROVIDED WITH AIR BAG MODULE

(75) Inventors: Masami Harada, Tochigi-ken (JP); Jinichi Tanabe, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 09/995,155

(22) Filed: Nov. 27, 2001

(65) Prior Publication Data

US 2002/0063452 A1 May 30, 2002

(30) Foreign Application Priority Data

Nov. 30, 2000 (JP) ........................... 2000-366403
Nov. 30, 2000 (JP) ........................... 2000-366404
Nov. 30, 2000 (JP) ........................... 2000-366405

(51) Int. Cl.$^7$ .................................................. B60N 2/42
(52) U.S. Cl. ............................... 297/216.3; 297/452.1; 280/730.2
(58) Field of Search .................. 297/216.13, 454.41, 297/452.6, 452.59, 452.58, 218.2, 218.3; 280/730.2, 730.1, 728.3, 728.2

(56) References Cited

U.S. PATENT DOCUMENTS

| | | | | |
|---|---|---|---|---|
| 5,727,811 A | * | 3/1998 | Nagata et al. | 280/731 |
| 5,893,579 A | * | 4/1999 | Kimura et al. | 280/728.3 |
| 5,927,749 A | * | 7/1999 | Homier et al. | 280/730.2 |
| 5,967,546 A | * | 10/1999 | Homier et al. | 280/730.2 |
| 5,992,878 A | * | 11/1999 | Narita et al. | 280/728.2 |
| 6,003,939 A | * | 12/1999 | Nakai et al. | 297/216.13 |
| 6,045,151 A | * | 4/2000 | Wu | 280/728.3 |
| 6,357,789 B1 | * | 3/2002 | Harada et al. | 280/728.3 |
| 6,406,093 B1 | * | 6/2002 | Miotto et al. | 297/218.5 |
| 6,431,584 B1 | * | 8/2002 | Nagasawa et al. | 280/728.2 |
| 6,439,597 B1 | * | 8/2002 | Harada et al. | 280/728.2 |

FOREIGN PATENT DOCUMENTS

JP 11115676 4/1999

* cited by examiner

Primary Examiner—Peter M. Cuomo
Assistant Examiner—Stephanie Harris
(74) Attorney, Agent, or Firm—Dann, Dorfman, Herrell and Skillman, P.C.

(57) ABSTRACT

A seat provided with an air bag module, including a seat back having a back pad, a seat back frame for supporting the back pad, and a trim cover covering the back pad and the seat back frame, the back pad having a cavity, an air bag module having an air bag and an inflator for causing the air bag to be inflated and developed, the air bag module being accommodated in the cavity of the back pad and attached to the seat back frame, the trim cover having a sewing portion acting as a breaking portion broken according to an inflation and development of the air bag, first and second stay cloths provided in the trim cover by sewing the first and second stay cloths together with the sewing portion of the trim cover, terminals of the first and second stay cloths being taken into the cavity of the back pad so as to wrap the air bag module, and a support wire system arranged at the back of the air bag module for pulling and supporting the first and second stay cloths, the support wire system coupled to the terminals of the first and second stay cloths and engaged with the seat back frame.

21 Claims, 11 Drawing Sheets

SEAT PROVIDED WITH AIR BAG MODULE

BACKGROUND OF THE INVENTION

1. Field of the Invention

This invention relates to an improvement of a seat having an air bag module provided in a side of a seat back thereof for absorbing side-shock, in which an air bag can be inflated and deployed due to a gas pressure generated by an inflator.

2. Description of Related Art

Conventionally, as a seat provided with an air bag module, there has been proposed a seat in which a breaking portion of a trim cover is formed by pinching and sewing terminals of the trim cover together with respective terminals of two stay cloths in the trim cover, an air bag module is wrapped up by the two stay cloths and mounted to a side plate of a seat back frame, and all elements for a seat back, including the air bag module, are covered by the trim cover (Japanese Patent Application laid open under Provisional Publication No. 11-115676).

In the conventional seat provided with the air bag module, the two stay cloths are separated into two directions from the sewing portion of the trim cover which serves as a breaking portion of the trim cover, one of the stay cloths is rolled in a rear side of a back pad from a side portion of the back pad, the other of the stay cloths is rolled in a front side of the back pad from a bank portion of the back pad, and the stay cloths are taken into an interior of the back pad through holes for suspending the trim cover, and end portions of the stay cloths which are taken in the interior of the back pad are coupled to each other by a hooking clip, whereby the stay cloths are attached to the back pad.

In the seat provided with the air bag module, the stay cloths cover several areas of the back pad, so that an inflating pressure of the air bag causes the back pad to be deflected and deformed, to thereby cause the stay cloths to be dragged. Therefore, the seat with the air bag module has a disadvantage in that an inflating pressure of the air bag can not be concentrated on the sewing portion of the trim cover which acts as the breaking portion of the trim cover.

SUMMARY OF THE INVENTION

The present invention has been made to avoid the foregoing disadvantage of the prior art.

It is therefore an object of this invention to provide a seat with an air bag module, in which stay cloths are installed inside a trim cover by sewing the stay cloths together with a sewing portion of the trim cover which forms a breaking portion, and taken into a cavity of a back pad, an air bag module is covered directly by the taken-in stay cloths, and the stay cloths are steadily and securely supported to a seat back frame through a support wire system, so that an inflating pressure of an air bag can be efficiently concentrated on the sewing portion corresponding to the breaking portion, thereby quickly inflating and developing the air bag.

It is another object of the present invention to provide the seat as stated above, wherein the stay cloths can be easily supported to the seat back frame.

In accordance with the present invention, there is provided a seat provided with an air bag module. The seat comprises a seat back having a back pad, a seat back frame for supporting the back pad, and a trim cover covering the back pad and the seat back frame, an air bag module having an air bag and an inflator for causing the air bag to be inflated and developed, the back pad having a cavity, the air bag module being accommodated in the cavity of the back pad and mounted to the seat back frame, the trim cover having a sewing portion acting as a breaking portion broken according to an inflation and development of the air bag, first and second stay cloths provided in the trim cover by sewing the first and second stay cloths together with the sewing portion of the trim cover, terminals of the first and second stay cloths being taken into the cavity of the back pad so as to wrap the air bag module, and a support wire system arranged at the back of the air bag module for pulling and supporting the first and second stay cloths, the support wire system being coupled to the terminals of the first and second stay cloths and engaged with the seat back frame.

The seat may further include an engaging member mounted to the seat back frame. The support wire system may comprise a first support wire for pulling and supporting the first stay cloth and a second support wire for pulling and supporting the second stay cloth. The first support wire comprises a first support portion coupled to a terminal of the first stay cloth, the first support portion having first and second ends, first and second spaced apart arm portions extending from the first and second ends perpendicularly to the first support portion and being parallel to each other, first and second hook portions formed into substantially U-shapes by bending end portions of the first and second arm portions, the first and second hook portions being suspended on and engaged with the engaging member, and first and second lock portions formed by bending free end portions of the first and second hook portions. The second support wire comprises a second support portion coupled to a terminal of the second stay cloth, the second support portion having third and fourth ends, third and fourth spaced apart arm portions extending from the third and fourth ends perpendicularly to the second support portion and being parallel to each other, third and fourth hook portions formed into substantially U-shapes by bending end portions of the third and fourth arm portions, the third and fourth hook portions being suspended on and engaged with the engaging member, and third and fourth lock portions formed by bending free end portions of the third and fourth hook portions. The first lock portion of the first support wire and the third lock portion of the second support wire are engaged and interlocked with each other. The second lock portion of the first support wire and the fourth lock portion of the second support wire are engaged and interlocked with each other.

The first and second lock portions of the first support wire extend laterally from the free end portions of the first and second hook portions. The third and fourth lock portions of the second support wire extend upwardly from the free end portions of the third and fourth hook portions. The free end portions of the third and fourth hook portions of the second support wire may extend obliquely. The third and fourth lock portions of the second support wire may be formed into substantially U-shapes and offset relative to the third and fourth arm portions of the second support wire.

The engaging member may include first and second valley portions. The first hook portion of the first support wire and the third hook portion of the second support wire are engaged with the first valley portion, and the second hook portion of the first support wire and the fourth hook portion of the second support wire are engaged with the second valley portion.

Each of the first and second stay cloths may be formed into a loop-shape. The first support portion of the first support wire has a length corresponding to the width of the first stay cloth and is fed through the first loop-like stay cloth. The second support portion of the second support wire has a length corresponding to the width of the second stay cloth and is fed through the second loop-like stay cloth. The first support wire further includes first and second shoulder portions formed by bending inwardly regions between the first and second ends of the first support portion and the first and second arm portions. The second support wire further includes third and fourth shoulder portions formed by bending inwardly regions between the third and fourth ends of the second support portion and the first and second arm portions.

BRIEF DESCRIPTION OF THE DRAWINGS

These and other objects and many of the attendant advantages of the present invention will be readily appreciated as the same become better understood by reference to the following detailed description when considered in connection with the accompanying drawings, in which like reference numerals designate the same parts throughout the Figures and wherein:

FIG. 4 is a schematic enlarged view showing the combination of FIG. 3;

DETAILED DESCRIPTION OF THE PREFERRED EMBODIMENTS

A seat provided with an air bag module according to the present invention will be discussed hereinafter with reference to the accompanying drawings.

Figure 1:
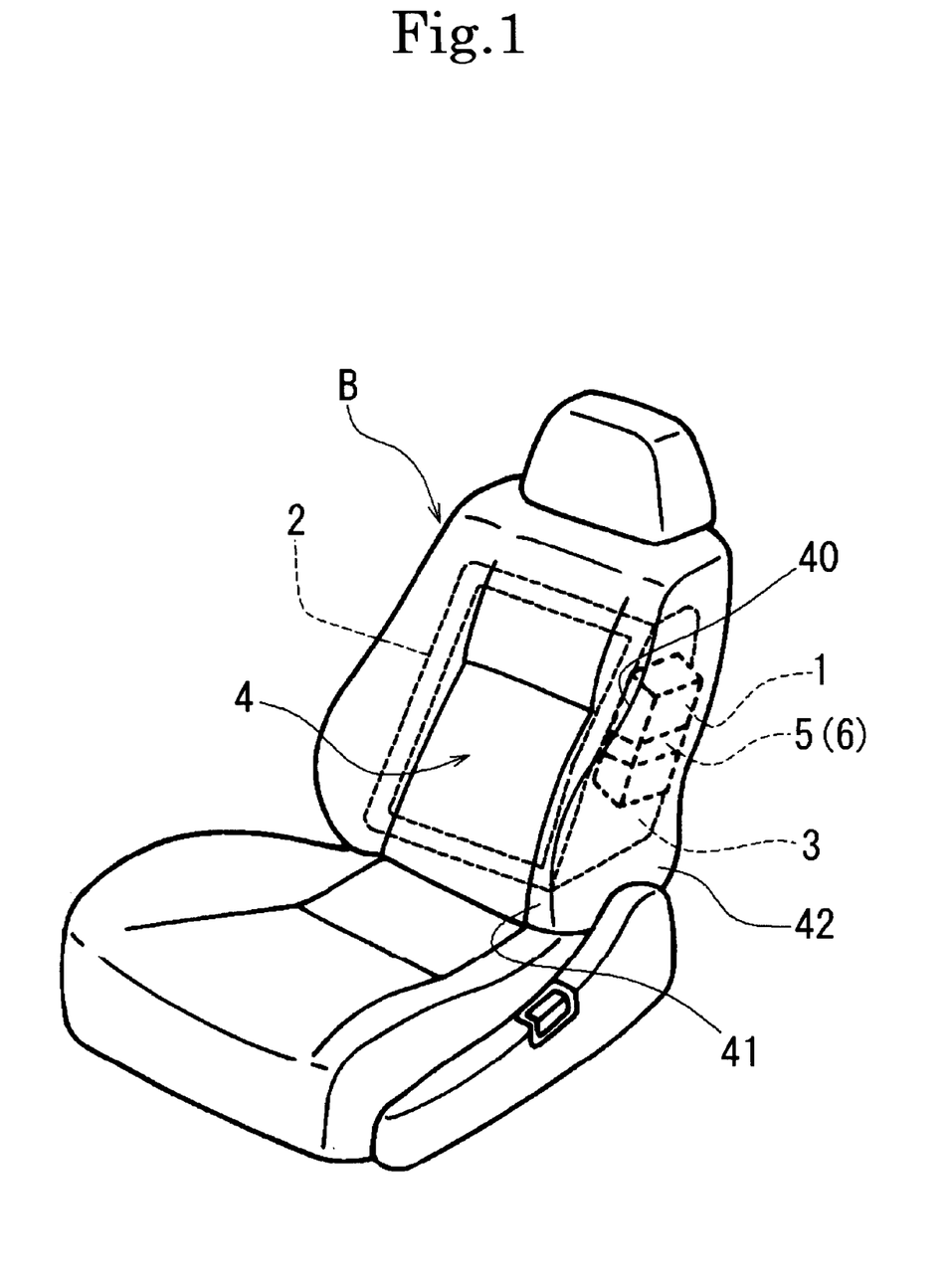
FIG. 1 is a schematic perspective view of a seat with an air bag module according to the present invention.

Referring to FIG. 1, there is illustrated an assistant seat for an automotive vehicle to be used in Japan, in which an air bag module 1 is provided in a right side of a seat back B of the assistant seat as viewed from a front side of the automotive vehicle. Incidentally, when the automotive vehicle is to be used in U.S.A., the air bag module 1 is provided in a left side of the seat back B of the assistant seat as viewed from the front side of the automotive vehicle. The seat back B includes a back pad, a seat back frame 2 for supporting the back pad, an air bag module 1 mounted to a side plate 3 of the seat back frame 2, and a trim cover 4 covering the entire elements making-up the seat back B, whereby the seat back B is constructed as an in-air bag module seat back. The trim cover has a sewing portion 40 acting as a breaking portion torn or broken according to an inflation and development of an air bag (not shown).

Although a construction of the air bag module 1 is not particularly shown in FIG. 1, the air bag module 1 includes a retainer, an inflator held by the retainer, an air bag, and a module case. The inflator held by the retainer is incorporated in the air bag with a fastening bolt of the retainer projecting out of the air bag, and the air bag having the inflator and the retainer housed therein is placed in the module case with the fastening bolt projecting out of the module case. The inflator is provided with a harness and connectors which are necessary to form an electrical circuit between the inflator and associated equipment such as an impact sensor.

As the module case, there may be employed a case which includes a case body and a lid openably hinged to the case body, or a housing which includes a housing body formed with a brittle portion in a front side thereof, the brittle portion comprising, e.g., a V-shaped groove and acting as a breaking portion of the housing body which is broken when the air bag is inflated and developed, and a lower plate mounted in the housing body. The case and housing can be opened by the inflating pressure of the air bag.

Figure 2:
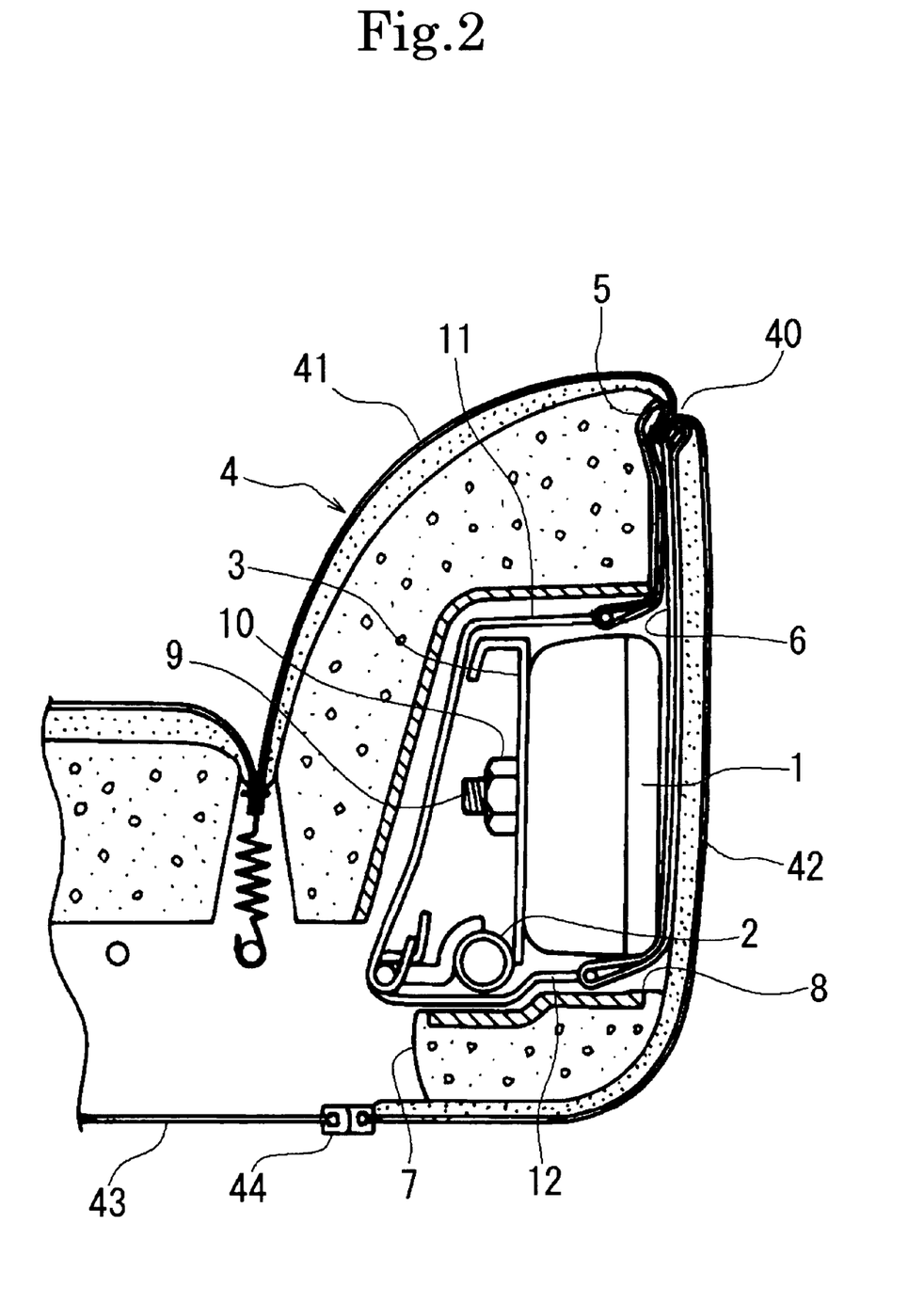
FIG. 2 is a schematic fragmentary sectional view of a seat back of the seat shown in FIG. 1.

Referring to FIG. 2, the air bag module 1 is wrapped by first and second stay cloths 5, 6, accommodated in a cavity 8 of the back pad 7, and mounted to the side plate 3 of the seat back frame 2 by the fastening bolt 9 of the retainer and a locknut 10. The entire back pad 7 including the air bag module 1 is covered by the trim cover 4, and the inflator is electrically connected to the impact sensor provided at a body of the automotive vehicle.

As a material for the trim cover 4, there may be employed a material which is selected from a group consisting of a leather, a synthetic leather and a fabric, or a wadding cover integrally laminated by a surface material, a wadding material and a backing material. The trim cover 4 corresponds to the seat back having bank portions, and is formed into a bag shape by sewing a front surface cover portion 41 covering right and left bank surfaces from a center of a seat surface and a side surface cover portion 42 extending from a peripheral side surface to a back surface and foldably mounting a back surface cover portion 43 to a slide fastener 44.

In the trim cover 4, the breaking portion 40 (FIG. 1) broken according to the inflation and development of the air bag is formed from a sewing portion between the front surface cover portion 41 covering the right and left bank surfaces from the center of the seat surface and the side surface cover portion 42 extending from the peripheral side surface to the back surface. The sewing portion corresponding to the breaking portion 40 can be sewed so as to be easily broken due to a stress generated by the inflation of the air bag while keeping a strength sufficient to resist against a normal use by sewing about No. 8 count yarn and about No. 20 count yarn as vertical sewing yarns.

Instead of being formed from the sewing portion between the front surface cover portion 41 and the side surface cover portion 42, the breaking portion 40 may be formed from a sewing portion provided at the side surface cover portion 42 so as to be disposed in proximity to a side of the module case which is opened according to the inflation and development of the air bag. In this case, the breaking portion 40 is disposed in proximity to the side of the module case which is opened due to the inflation and development of the air bag, so that the inflating pressure of the air bag can be quickly applied to the side of the module case and the inflation and development of the air bag is not prevented by the back pad 7.

Figure 3:
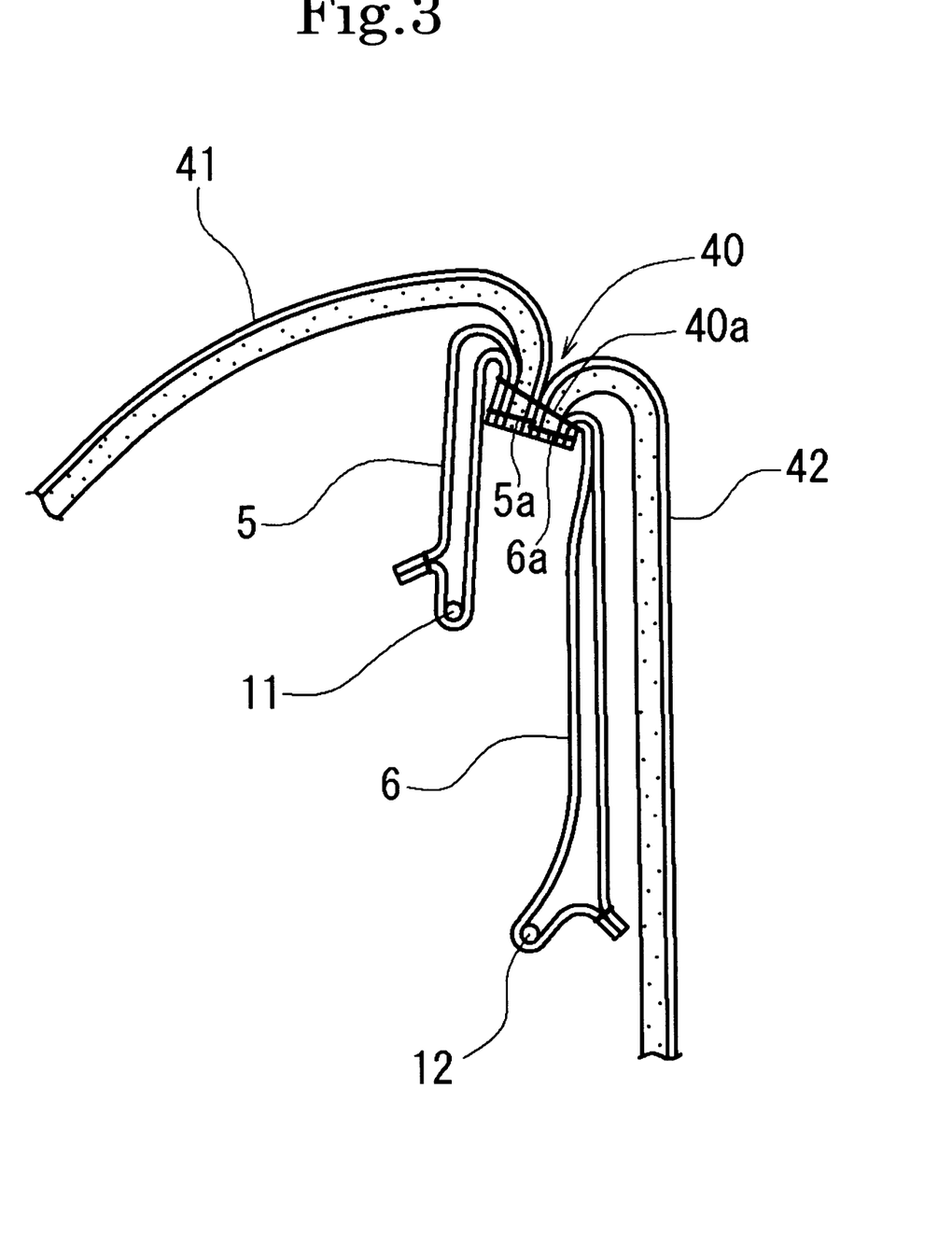
FIG. 3 is a schematic view showing a combination of stay cloths and a trim cover of the seat back.
Figure 4:
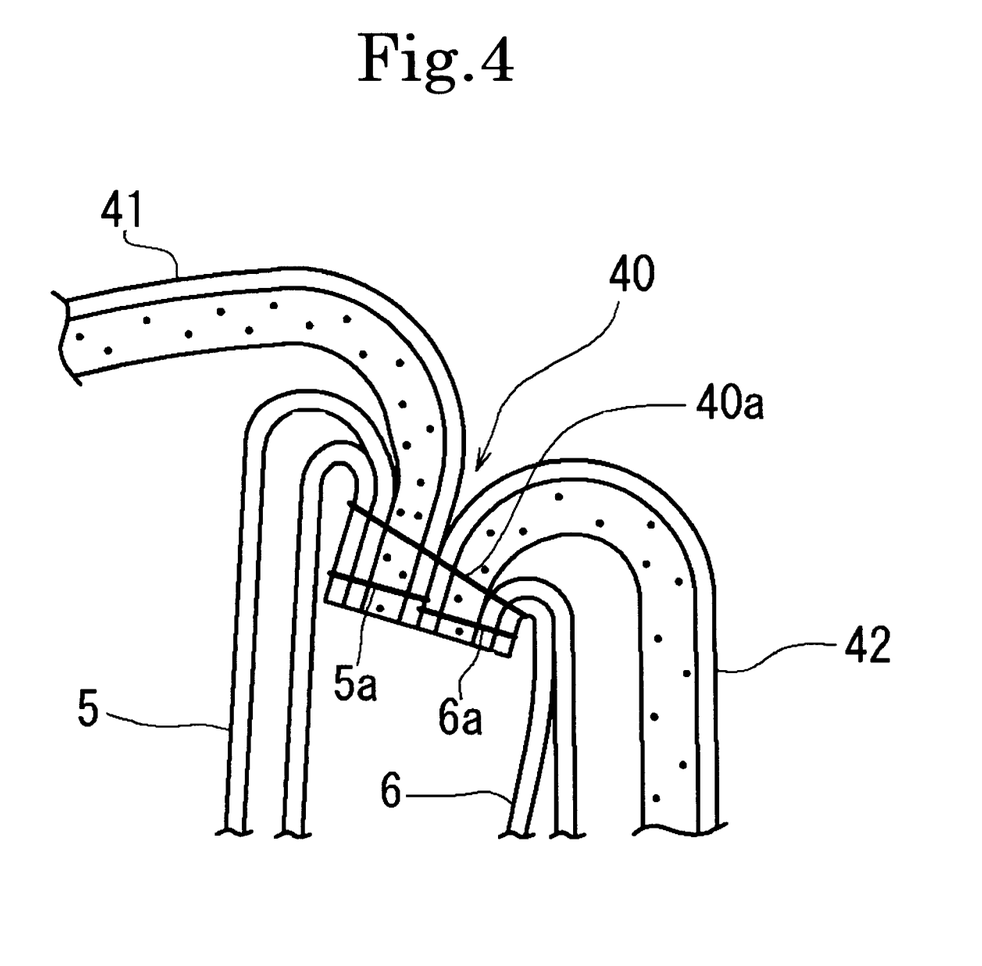

Referring to FIGS. 3 and 4, each of the first and second stay cloths 5, 6 is formed into a loop-shape. The first and second stay cloths 5, 6 are installed inside the trim cover 4 by sewing first terminal ends of the first stay cloth 5 to a terminal of the front surface cover portion 41 by a yarn 5a and sewing second terminal ends of the second stay cloth 6 to a terminal of the side surface cover portion 42 by a yarn 6a. Further, the front surface cover and side surface cover portions 41, 42 are sewed together with the first and second stay cloths 5, 6 by a yarn 40a with the terminals of the front surface cover and side surface cover portions 41, 42 being sandwiched between the first and second stay cloths 5, 6, thereby forming the sewing portion corresponding to the breaking portion 40. Each of the first and second stay cloths 5, 6 is formed from a material which does not lengthen when it is subjected to the inflating pressure of the air bag, and which is selected from a group consisting of a polyester non-woven fabric and a cotton cloth.

The first and second stay cloths 5, 6 are sewed together with the terminals of the front surface cover and side surface cover portions 41, 42 in such a manner that the inflating pressure of the air bag can be applied to the sewing thread of the breaking portion 40 and the terminals of the front surface cover and side surface cover portions 41, 42 are not frayed in a normal use. Third and fourth terminal ends of the stay cloths 5, 6 are sewed using low count yarns.

The stay cloths 5, 6 are sewed together with the front surface cover and side surface cover portions 41, 42 at portions thereof which are away from the terminal ends of the stay cloths 5, 6 as shown in FIGS. 3 and 4. Therefore, when the stay cloths 5, 6 are subjected to the inflating pressure of the air bag, the stay cloths 5, 6 are pulled at the portions thereof which are sewed together with the terminals of the front surface cover and side surface cover portions 41, 42 by the yarn 40a, whereby the yarn 40a is cut and the breaking portion 40 is broken. At this time the first terminal ends of the first stay cloth 5 and the second terminal ends of the second stay cloth 6 remain sewed together with the front surface cover portion 41 and the side surface cover portion 42 by the yarns 5a, 6a, without separating from the front surface cover and side surface cover portions 41, 42.

Figure 5:
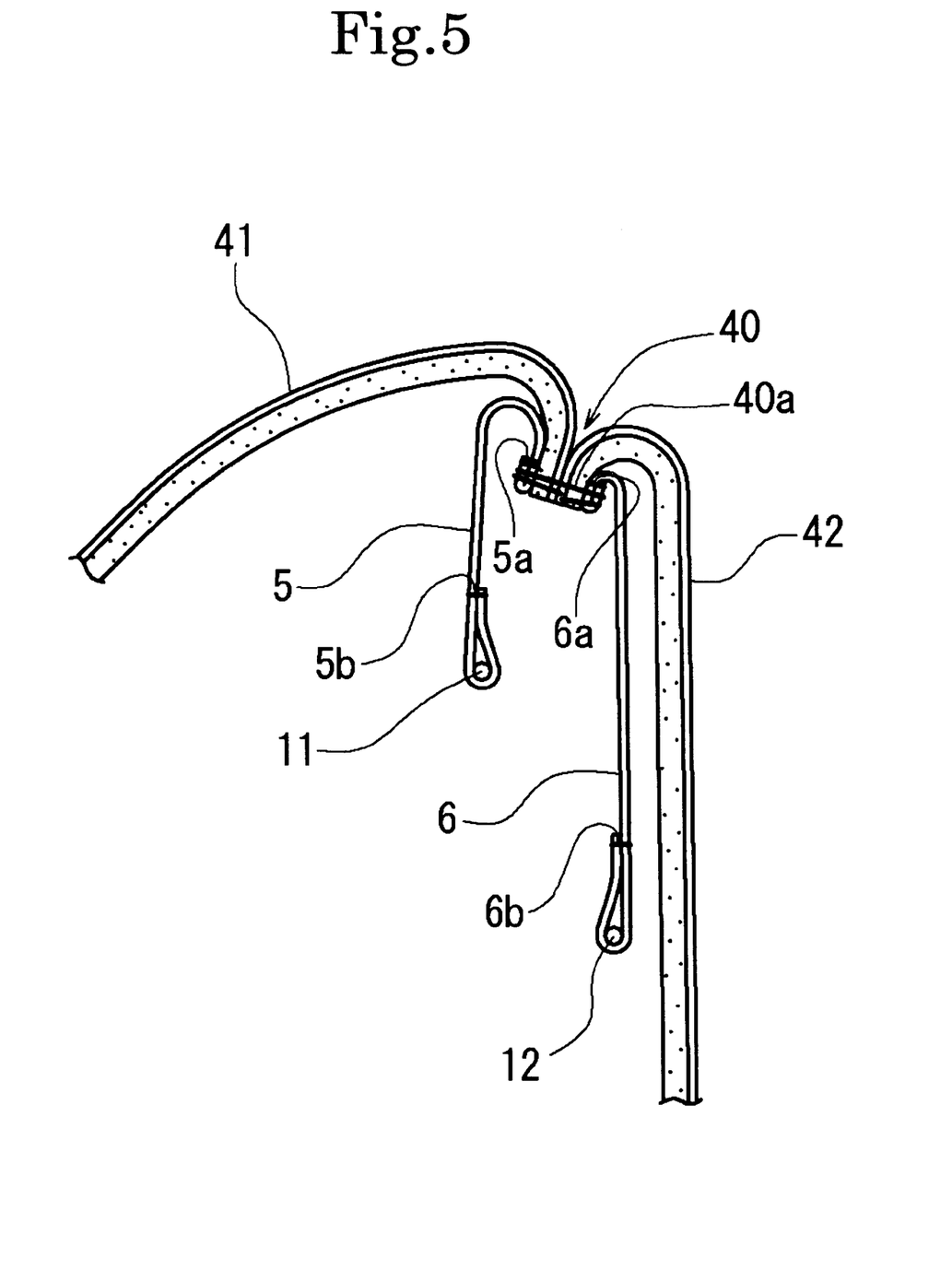
FIG. 5 is a schematic view showing a modification of the combination of FIGS. 3 and 4.

Referring to FIG. 5, there is illustrated a modification of the combination of the stay cloths 5, 6 and the trim cover of FIGS. 3 and 4. In the modification, first terminals of the stay cloths 5, 6 are folded back and sewed by yarns 5a, 6a, and further sewed together with the terminals of the front surface cover and side surface cover portions 41, 42 by the yarn 40a. Further, second terminals of the stay cloths 5, 6 are folded back into loop-shapes and sewed by yarns 5b, 6b. The second terminals of the stay cloths 5, 6 are supported to support wires 11, 12 (discussed later) by drawing the support wires 11, 12 through the second loop-like terminals of the stay cloths 5, 6.

Figure 6:
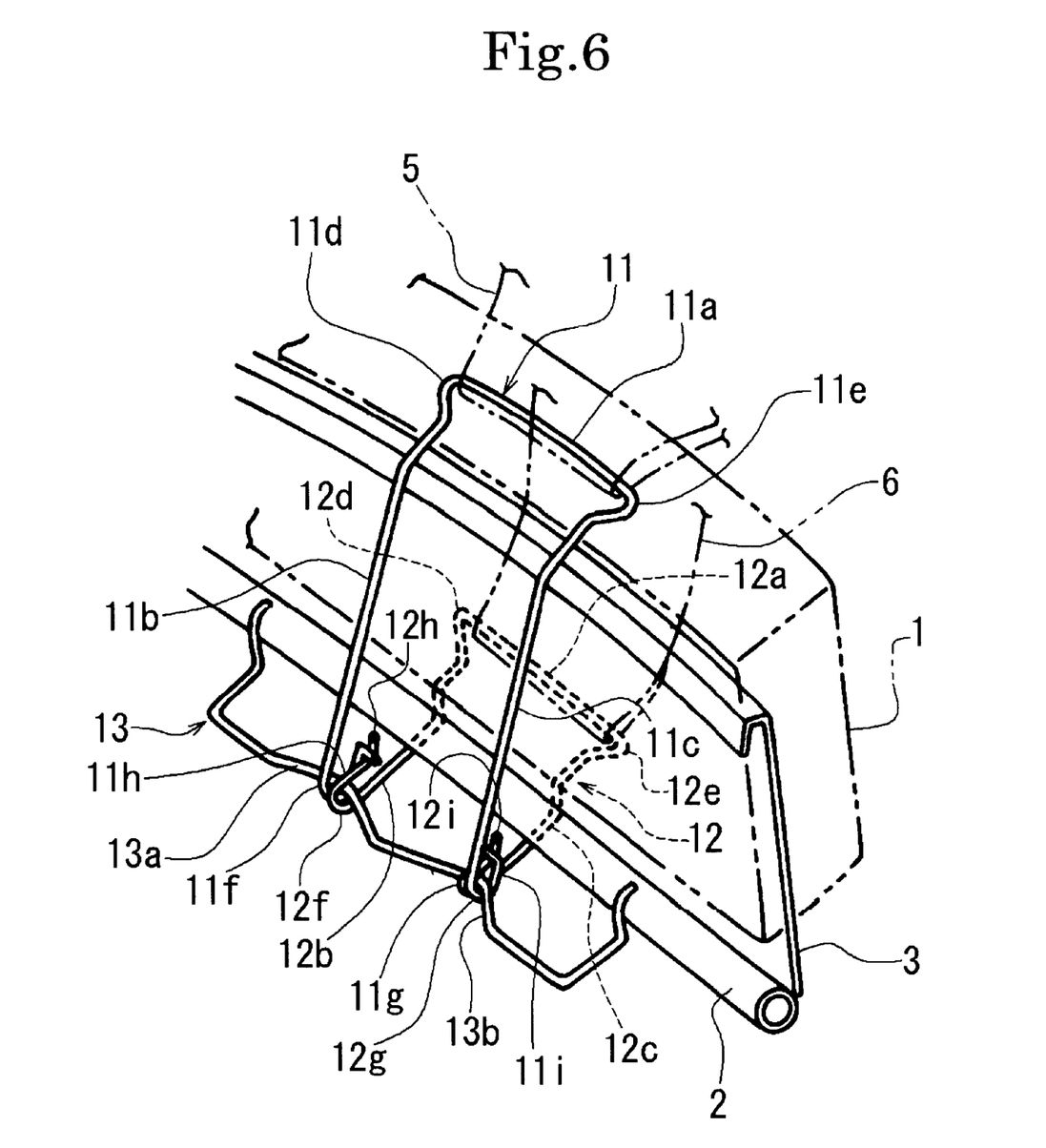
FIG. 6 is a schematic perspective view showing mainly a support wire system for pulling and causing the stay cloths to be supported to a seat back frame.

Referring to FIG. 6, the first and second stay cloths 5, 6 of FIGS. 3 and 4 are pulled and secured to the seat back frame 2 by a support wire system which is arranged at the back of the side plate 3 having the air bag module 1 mounted thereto and comprises first and second support wires 11, 12. More particularly, the first stay cloth 5 and the second stay cloth 6 are coupled to the first support wire 11 and the second support wire 12, respectively, by causing the first support wire 11 to be fed through the loop-like stay cloth 5 and causing the second support wire 12 to be fed through the loop-like stay cloth 6. Each of the first and second support wires 11, 12 is formed from a wire material selected from a group consisting of a high carbon steel wire rod and a piano wire rod.

The first support wire 11 comprises a support portion 11a which is fed through and coupled to the loop-like stay cloth 5, a pair of spaced apart arm portions 11b, 11c which extend from both ends of the support portion 11a perpendicularly to the support portion 11a and are parallel to each other, shoulder portions 11d, 11e which are formed by bending inwardly regions between the both ends of the support portion 11a and first ends of the arm portions 11b, 11c, hook portions 11f, 11g formed by causing second ends of the arm portions 11b, 11c to be bent into U-shapes, and lock portions 11h, 11i formed by bending free ends of the hook portions 11f, 11g. Similarly, the second support wire 12 comprises a support portion 12a which is fed through and coupled to the loop-like stay cloth 6, a pair of spaced apart arm portions 12b, 12c which extend from both ends of the support portion 12a perpendicularly to the support portion 12a and are parallel to each other, shoulder portion 12d, 12e which are formed by bending inwardly regions between the both ends of the support portion 12a and third ends of the arm portions 12b, 12c, hook portions 12f, 12g formed by causing fourth ends of the arm portions 12b, 12c to be bent into U-shapes, and lock portions 12h, 12i formed by bending free ends of the hook portions 12f, 12g.

Figure 7:
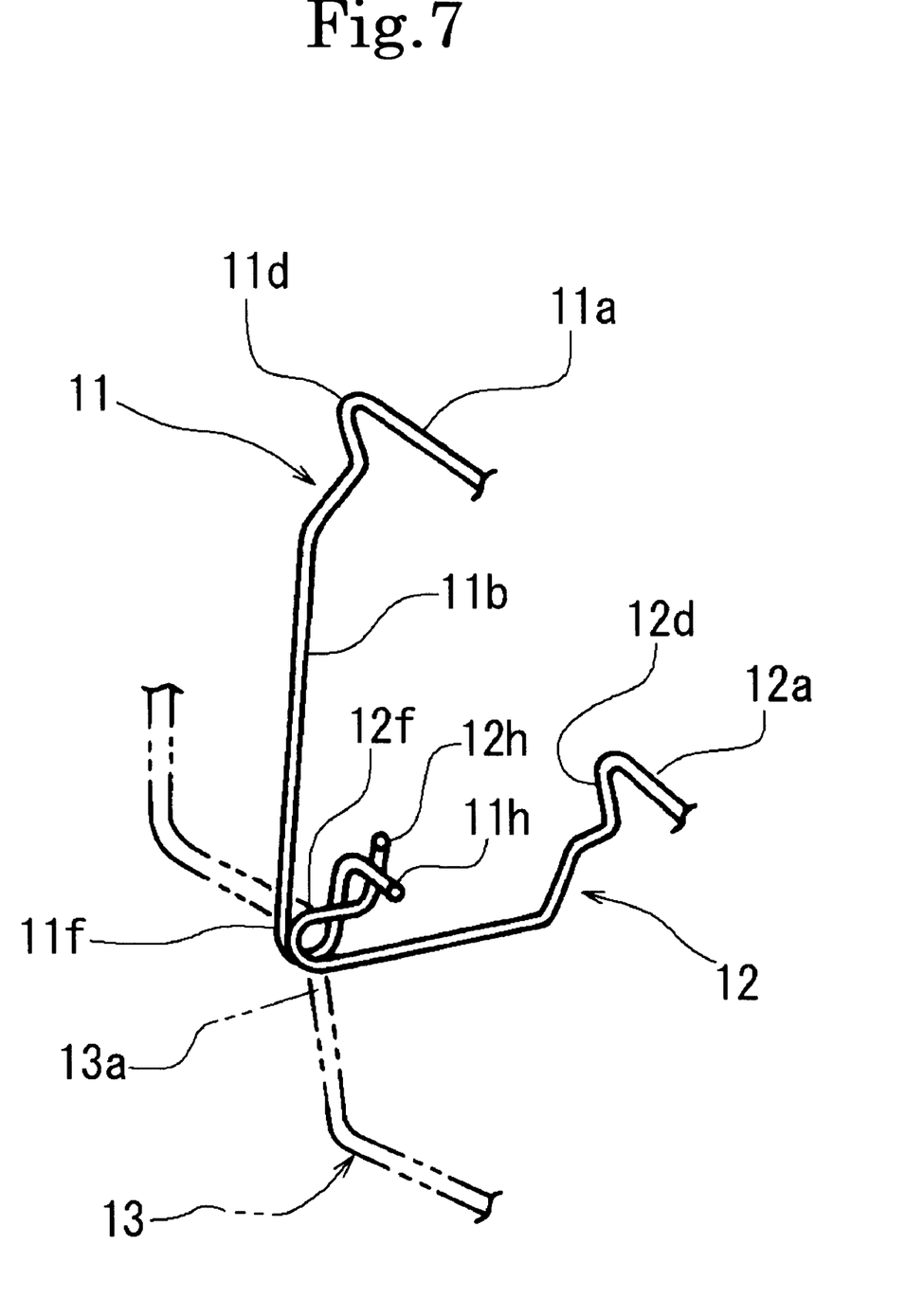
FIG. 7 is a schematic view of assistance in explaining a construction for causing first and second support wires of the support wire system to be interlocked with each other.

The support portion 11a of the first support wire 11 has a length substantially corresponding to the width of the stay cloth 5. Similarly, the support portion 12a of the second support wire 12 has a length substantially corresponding to the width of the stay cloth 6. The shoulder portions 11d, 11e of the first support wire 11 serve as means to prevent the stay cloth 5 from moving along the axis of the support portion 11a to which the stay cloth 5 is supported. Similarly, the shoulder portions 12d, 12e of the second support wire 12 serve as means to prevent the stay cloth 6 from moving along the axis of the support portion 12a to which the stay cloth 6 is supported. As shown in FIG. 7, the lock portions of the first support wire 11 (only the lock portion 11h of the first support wire 11 is shown in FIG. 7) are bent laterally from the hook portions of the first support wire 11 (only the hook portion 11f of the first support wire 11 is shown in FIG. 7). The lock portions of the second support wire 12 (only the lock portion 12h of the second support wire 12 is shown in FIG. 7) are bent upwardly from the hook portions of the second support wire 12 (only the hook portion 12f of the second support wire 12 is shown in FIG. 7). The laterally bent lock portions of the first support wire 11 are interlocked with the upwardly bent lock portions of the second support wire 12.

The seat back frame 2 is provided with an engaging member 13 which is attached to the seat back frame 2 by, e.g., welding, and which is formed from a metal bar or the like (see FIG. 6). The engaging member 13 has a length longer than a distance between the arm portions 11*b*, 11*c* of the first support wire 11 and a distance between the arm portions 12*b*, 12*c* of the second support wire 12. The engaging member 13 has first and second valley portions 13*a*, 13*b* of substantially V-shapes. The hook portions 11*f*, 12*f* of the support wires 11, 12 and the hook portions 11*g*, 12*g* of the support wires 11, 12 are suspended on and engaged with the first valley portion 13*a* and the second valley portion 13*b*, respectively. Thus, the first and second support wires 11, 12 are prevented from moving along the axis of the engaging member 13.

When the seat back B is to be assembled, prior to covering the back pad 7 by the trim cover 4, the fastening bolt 9 projecting out of the case of the air bag module 1 is penetrated through a receiving hole (not shown) formed in the side plate 3 of the seat back frame 2, and the locknut 10 is fastened on the fastening bolt 9, whereby the air bag module 1 is secured to the side plate 3 (see FIG. 2).

One 5 of the stay cloths 5, 6 provided at the trim cover 4 is taken into the cavity 8 of the back pad 7 from one side of the air bag module 1, and the other 6 of the stay cloths 5, 6 is rolled from a front side of the air bag module 1 to the other side of the air bag module 1 and taken into the cavity 8 of the back pad 7.

The first and second support wires 11, 12 which were previously fed through the loop-like stay cloths 5, 6 or are fed through the loop-like stay cloths 5, 6 after the stay cloths 5, 6 are taken into the cavity 8 of the back pad 7, are suspended on the engaging member 13 and interlocked with each other. Thus, the stay cloths 5, 6 can be easily pulled and supported to the engaging member 13 through the support wire system.

Figure 8:
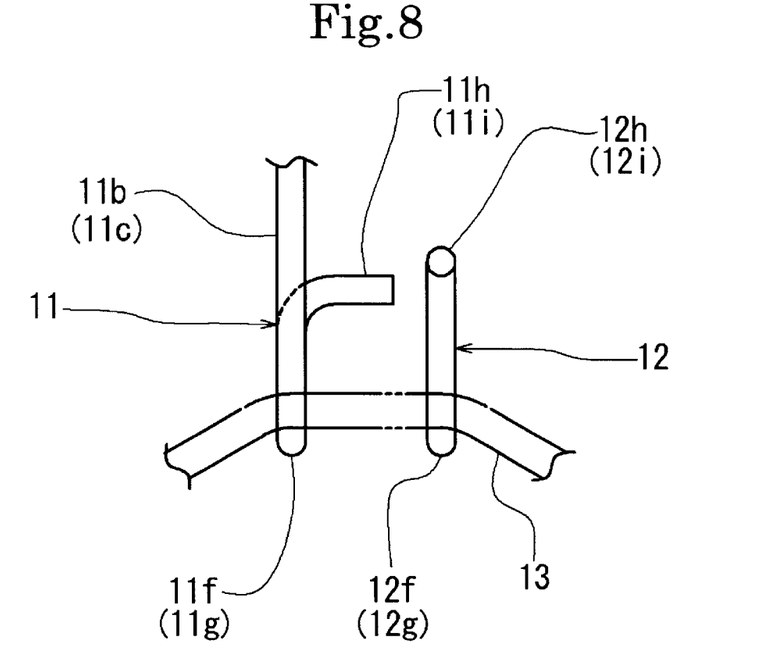
FIG. 8 is a schematic view of assistance in explaining a state where the first and second wires are suspended on an engaging member.
Figure 9:
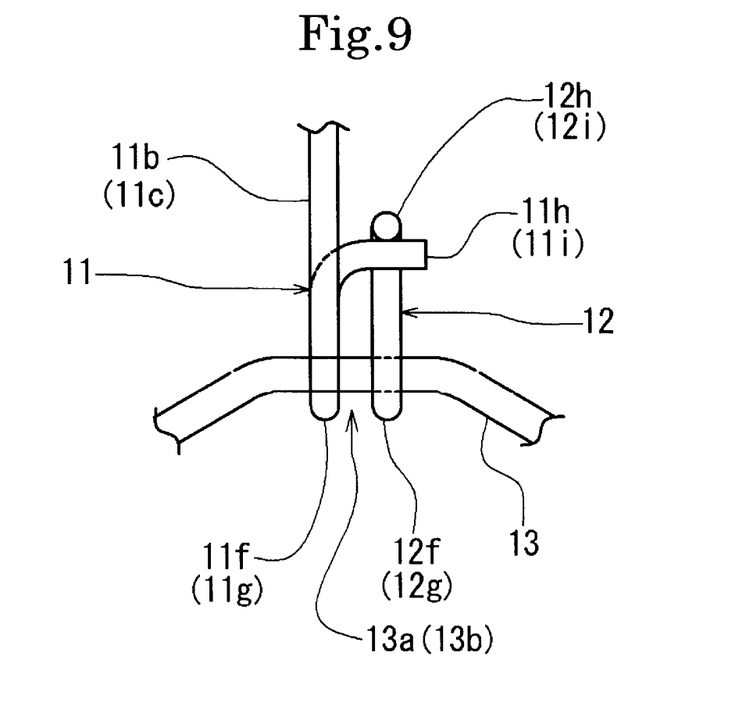
FIG. 9 is a schematic view of assistance in explaining a state where the first and second wires are entwined or engaged with each other.

As shown in FIGS. 6 and 8, the first and second support wires 11, 12 are suspended through the hook portions 11*f*, 11*g*, 12*f*, 12*g* thereof on the engaging member 13 and, as shown in FIG. 6 and 9, the hook portions 11*f*, 11*g*, 12*f*, 12*g* are moved to the V-shaped valley portions 13*a*, 13*b* of the engaging member 13 along the axis of the engaging member 13 and engaged with the V-shaped valley portions 13*a*, 13*b* of the engaging member 13, and the lock portions 11*h*, 11*i* of the first support wire 11 and the lock portions 12*h*, 12*i* of the second support wire 12 are interlocked with each other. While the first support wire 11 is suspended on the engaging member 13 with the hook portions 11*f*, 11*g* thereof being arranged outwardly of the hook portions 12*f*, 12*g* of the second support wire 12 on the engaging member 13 in the illustrated example, the first support wire 11 can be suspended on the engaging member 13 with the hook portions 11*f*, 11*g* thereof being arranged inwardly of the hook portions 12*f*, 12*g* of the second support wire 12 and the lock portions 11*h*, 11*i* of the first support wire 11 and the lock portions 12*h*, 12*i* of the second support wire 12 can be interlocked with each other.

Figure 10:
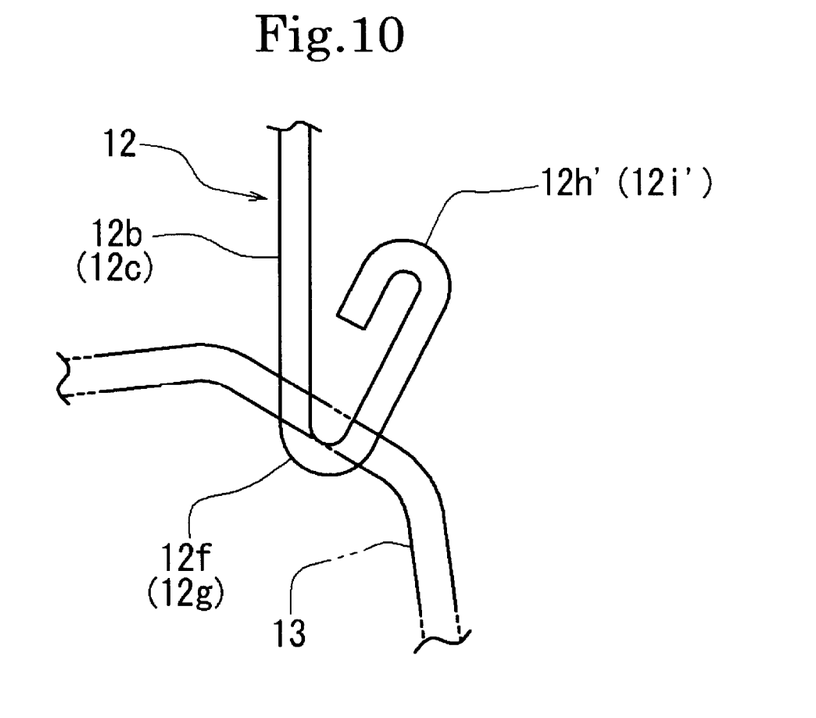
FIG. 10 is a schematic view showing a modification of the support wire system of FIG. 6.
Figure 11:
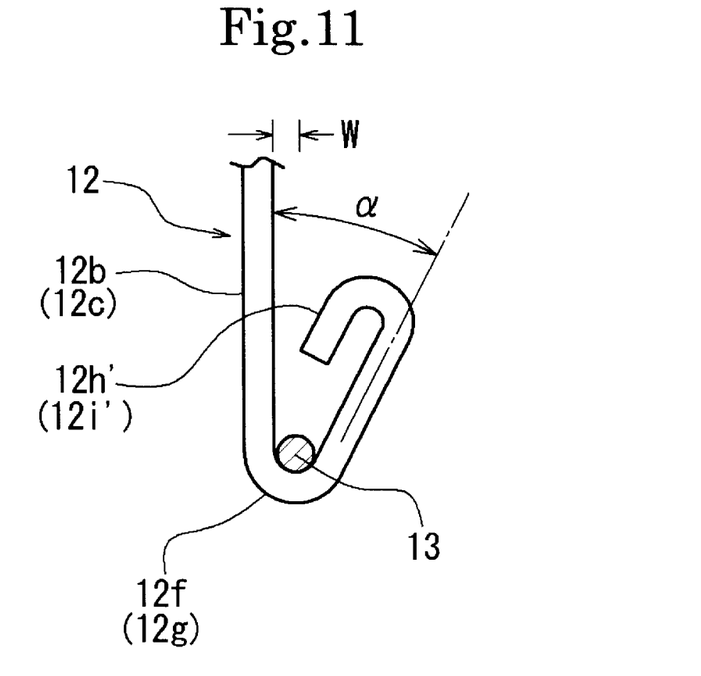
FIG. 11 is a schematic side view of a second support wire of the modification.
Figure 12:
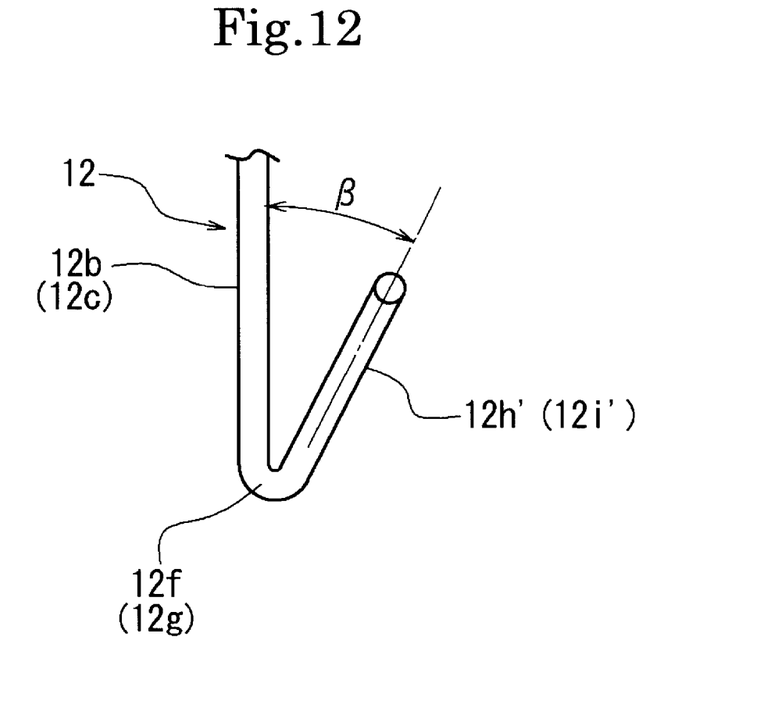
FIG. 12 is a schematic rear view of the second support wire of FIG. 11.

Referring to FIGS. 10–12, there is illustrated a modification of the support wire system shown in FIGS. 6–9. This modification is substantially similar to that of FIGS. 6–9 except that lock portions 12*h*', 12*i*' of the second support wire 12 are different in form from those 12*h*, 12*i* of the second support wire 12 which are shown in FIGS. 6–9. In the example shown in FIGS. 10–12, parts which are substantially similar to those shown in FIGS. 6–9 are denoted with like reference numerals and the description of them will not be repeated.

Unlike the lock portions 12*h*, 12*i* of FIGS. 6–9, the lock portion 12*h*' (12*i*') of FIGS. 10–12 is formed into a substantially U-shape by bending and twisting the free end of the hook portion 12*f* (12*g*) relative to the arm portion 12*b* (12*c*). More particularly, the free end portion of hook portion 12*f* (12*g*) extends obliquely and the lock portion 12*h*' (12*i*') is curved from the free end of the hook portion 12*f* (12*g*) toward the arm portion 12*b* (12*c*) and offset relative to an axial line of the arm portion 12*b* (12*c*). As shown in FIG. 11, an opening angle α between the free end of the hook portion 12*f* (12*g*) and the arm portion 12*b* (12*c*) is set so as to amount to about 20–30 degrees and a distance W between the arm portion 12*b* (12*c*) and a free end of the lock portion 12*h*' (12*i*') is set so as to have a size having tolerance of about ±1 mm according to a diameter of the engaging member 13. As shown in FIG. 12, a twisting or offset angle β of the free end portion of the hook portion 12*f* (12*g*) relative to the arm portion 12*b* (12*c*) may be set so as to amount to about 30–50 degrees. Incidentally, the opening angle α, the distance W and the offset angle β are properly set depending upon diameters of the first and second support wires 11, 12 employed in the event that it is necessary to change diameters of the first and second support wires 11, 12 according to an inflating pressure of the air bag.

Figure 13:
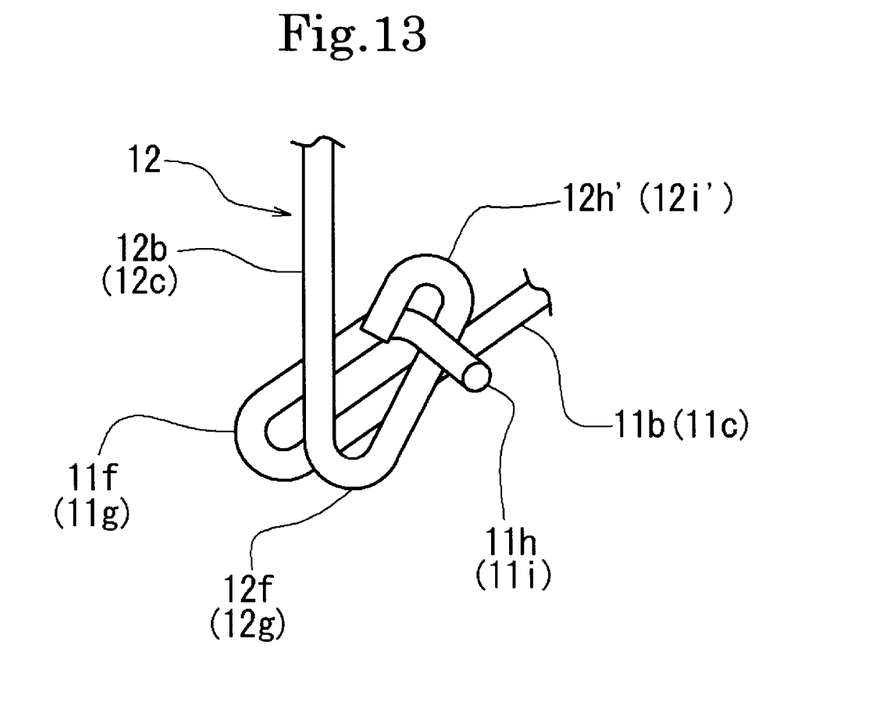
FIG. 13 is a schematic perspective view of assistance in explaining a state where a first support wire of the modification and the second support wire of FIGS. 11 and 12 are entwined or engaged with each other.
Figure 14:
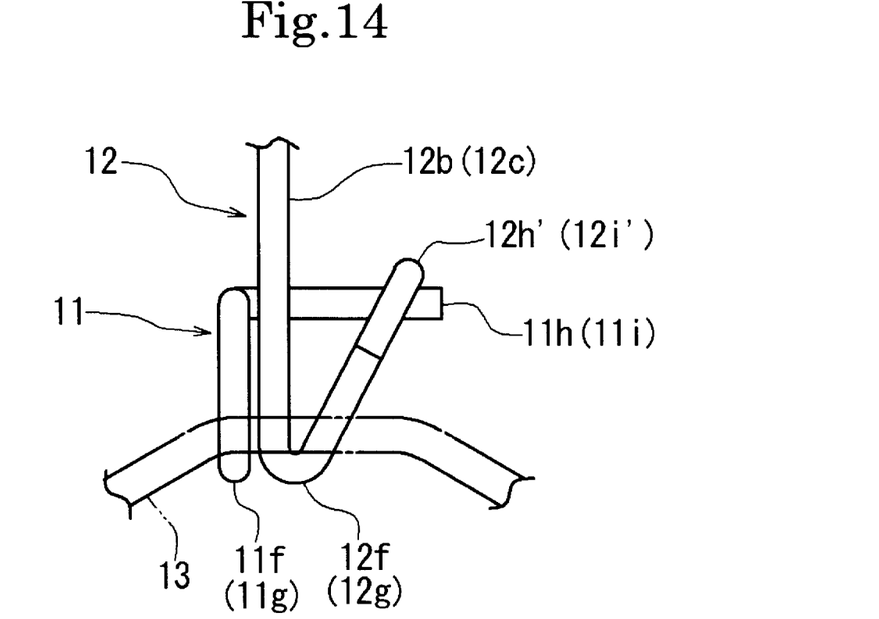
FIG. 14 is a schematic view of assistance in explaining a state where the first and second support wires of the modification are suspended on the engaging member and entwined or engaged with each other.
Figure 15:
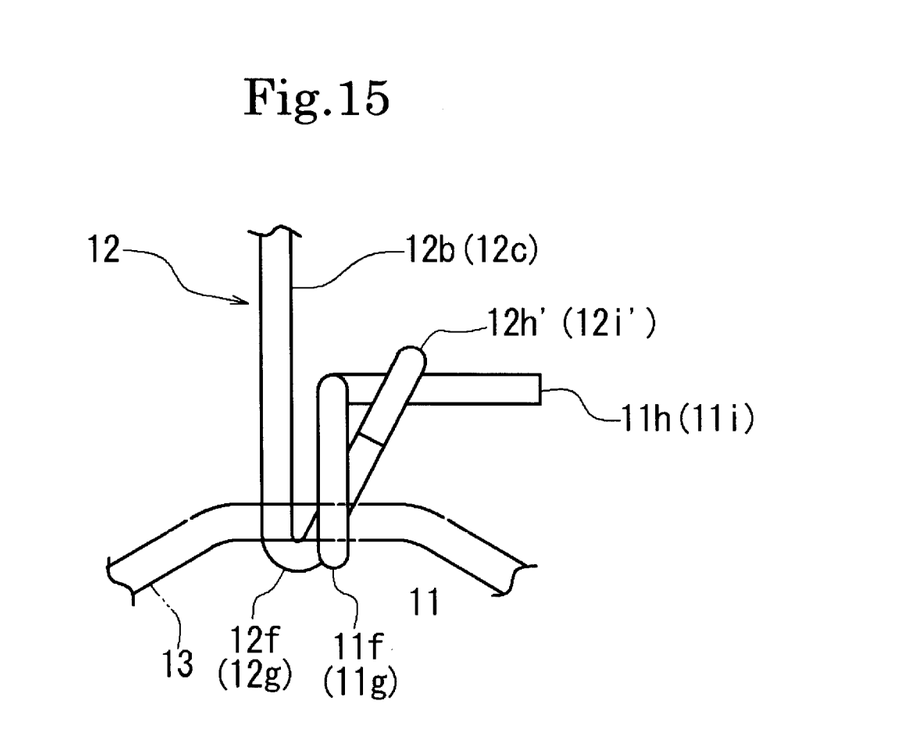
FIG. 15 is a schematic view of assistance in explaining another construction for causing the first and second support wires of the modification to be interlocked with each other.

As shown in FIGS. 13 and 14, the first support wire 11 is suspended on the engaging member 13 with the hook portion 11*f* (11*g*) being arranged outwardly of the hook portion 12*f* (12*g*) of the second support wire 12 on the engaging member 13, and the lock portion 11*h* (11*i*) of the first support wire 11 and the lock portion 12*h*' (12*i*') of the second support wire 12 are interlocked with each other. To the contrary, as shown in FIG. 15, the hook portion 11*f* (11*g*) of the first support wire 11 may be arranged inwardly of the hook portion 12*f* (12*g*) of the second support wire 12 on the engaging member 13, and the lock portion 11*h* (11*i*) of the first support wire 11 and the lock portion 12*h*' (12*i*') of the second support wire 12 can be interlocked with each other.

As discussed above, the hook portions of the first and second support wires 11 are suspended on the engaging member 13, and the lock portions of the first support wire 11 and the lock portions of the second support wire 12 are interlocked or engaged with each other, so that the first and second support wires 11, 12 can be steadily and securely attached to the engaging member 13 so as not to come off the engaging member 13.

After the stay cloths 5, 6 are supported to the engaging member 13 by the support wire system, the entire back pad 7 including the air bag module 1 is covered by the trim cover 4.

In the seat constructed as discussed above, the stay cloths are installed inside the trim cover by sewing the stay cloths together with the sewing portion of the trim cover which forms the breaking portion, and taken into the cavity of the back pad, the air bag module is covered directly by the taken-in stay cloths, and the stay cloths are steadily and securely supported to the seat back frame through the support wire system, so that the inflating pressure of the air bag can be efficiently concentrated on the sewing portion corresponding to the breaking portion, thereby quickly inflating and developing the air bag.

It will be apparent that the foregoing is merely illustrative of the principles of this invention, and that various modifications can be made by those skilled in the art without departing from the scope and spirit of the invention.

What is claimed is:

1. A seat provided with an air bag module, comprising:
   a seat back including a back pad, a seat back frame for supporting said back pad, and a trim cover covering said back pad and said seat back frame;

an air bag module including an air bag, and an inflator for causing said air bag to be inflated and developed;

said back pad having a cavity;

said air bag module being accommodated in said cavity of said back pad and attached to said seat back frame;

said trim cover having a sewing portion acting as a breaking portion which can be broken when said air bag inflates;

first and second stay cloths provided in said trim cover by sewing said first and second stay cloths together with said sewing portion of said trim cover;

said first and second stay cloths having terminals;

said terminals of said first and second stay cloths being taken into said cavity of said back pad so as to wrap said air bag module;

an engaging member attached to said seat back frame; and a support wire system arranged at the back of said air bag module for pulling and supporting said first and second stay cloths;

said support wire system coupled to said terminals of said first and second stay cloths and engaged with said seat back frame;

said support wire system comprising a first support wire for pulling and supporting said first stay cloth, and a second support wire for pulling and supporting said second stay cloth;

said first support wire comprising:
  a first support portion coupled to a terminal of said first stay cloth;
  said first support portion having first and second ends;
  first and second spaced apart arm portions extending from said first and second ends perpendicularly to said first support portion and being parallel to each other;
  first and second hook portions formed into substantially U-shapes by bending end portions of said first and second arm portions;
  said first and second hook portions being suspended on and engaged with said engaging member; and
  first and second lock portions formed by bending free end portions of said first and second hook portions;

said second support wire comprising:
  a second support portion coupled to a terminal of said second stay cloth;
  said second support portion having third and fourth ends;
  third and fourth spaced apart arm portions extending from said third and fourth ends perpendicularly to said second support portion and being parallel to each other;
  third and fourth hook portions formed into substantially U-shapes by bending end portions of said third and fourth arm portions;
  said third and fourth hook portions being suspended on and engaged with said engaging member; and
  third and fourth lock portions formed by bending free end portions of said third and fourth hook portions;

said first lock portion of said first support wire and said third lock portion of said second support wire being engaged and interlocked with each other; and said second lock portion of said first support wire and said fourth lock portion of said second support wire being engaged and interlocked with each other.

2. A seat provided with an air bag module according to claim 1, wherein said first and second lock portions of said first support wire extend laterally from said free end portions of said first and second hook portions, and wherein said third and fourth lock portions of said second support wire extend upwardly from said free end portions of said third and fourth hook portions.

3. A seat provided with an air bag module according to claim 1, wherein said first and second lock portions of said first support wire extend laterally from said free end portions of said first and second hook portions, wherein said free end portions of said third and fourth hook portions of said second support wire extend obliquely, and wherein said third and fourth lock portions of said second support wire are formed into substantially U-shapes and offset relative to said third and fourth arm portions of said second support wire.

4. A seat provided with an air bag module according to claim 1, wherein said engaging member includes first and second valley portions, said first hook portion of said first support wire and said third hook portion of said second support wire being engaged with said first valley portion, and said second hook portion of said first support wire and said fourth hook portion of said second support wire being engaged with said second valley portion.

5. A seat provided with an air bag module according to claim 2, wherein said engaging member includes first and second valley portions, said first hook portion of said first support wire and said third hook portion of said second support wire being engaged with said first valley portion, and said second hook portion of said first support wire and said fourth hook portion of said second support wire being engaged with said second valley portion.

6. A seat provided with an air bag module according to claim 3, wherein said engaging member includes first and second valley portions, said first hook portion of said first support wire and said third hook portion of said second support wire being engaged with said first valley portion, and said second hook portion of said first support wire and said fourth hook portion of said second support wire being engaged with said second valley portion.

7. A seat provided with an air bag module according to claim 1, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

8. A seat provided with an air bag module according to claim 2, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

9. A seat provided with an air bag module according to claim 3, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

10. A seat provided with an air bag module according to claim 4, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

11. A seat provided with an air bag module according to claim 5, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

12. A seat provided with an air bag module according to claim 6, wherein each of said first and second stay cloths is formed into a loop-shape, said first support portion of said first support wire having a length corresponding to the width of said first stay cloth and being fed through said first loop-like stay cloth, said second support portion of said second support wire having a length corresponding to the width of said second stay cloth and being fed through said second loop-like stay cloth, wherein said first support wire further includes first and second shoulder portions formed by bending inwardly regions between said first and second ends of said first support portion and said first and second arm portions, and wherein said second support wire further includes third and fourth shoulder portions formed by bending inwardly regions between said third and fourth ends of said second support portion and said third and second arm portions.

13. A seat provided with an air bag module, comprising:
a seat back including a back pad, a seat back frame for supporting said back pad, and a trim cover covering said back pad and said seat back frame;
an air bag module including an air bag, and an inflator for causing said air bag to be inflated and developed;
said back pad having a cavity;
said air bag module being accommodated in said cavity of said back pad and attached to said seat back frame;
said trim cover having a sewing portion acting as a breaking portion which can be broken when said air bag inflates;
first and second stay cloths provided in said trim cover by sewing said first and second stay cloths together with said sewing portion of said trim cover;
each of said first and second stay cloths being formed into a loop-shape;
said first and second stay cloths having terminals;
said terminals of said first and second stay cloths being taken into said cavity of said back pad so as to wrap said air bag module; and
a support wire system arranged at the back of said air bag module for pulling and supporting said first and second stay cloths;
said support wire system being coupled to said terminals of said first and second stay cloths and engaged with said seat back frame;
said support wire system comprising a first support wire for pulling and supporting said first stay cloth, and a second support wire for pulling and supporting said second stay cloth;
said first support wire comprising:
a first support portion fed through said first loop-like stay cloth;
said first support portion having first and second ends and a length corresponding to the width of said first stay cloth;
first and second spaced apart arm portion extending from said first and second ends perpendicularly to said first support portion and being parallel to each other; and
first and second shoulder portions formed by bending inwardly regions between said first and second ends of said first support portion and said first and second arm portions;
said second support wire comprising:
a second support portion fed through said second loop-like stay cloth;
said second support portion having third and fourth ends and a length corresponding to the width of said second stay cloth;
third and fourth spaced apart arm portions extending from said third and fourth ends perpendicularly to said second support portion and being parallel to each other; and
third and fourth shoulder portions formed by bending inwardly regions between said third and fourth ends of said second support portion and said third and fourth arm portions;

said first, second, third and fourth arm portions being engaged with said seat back frame.

14. A seat provided with an air bag module according to claim 13, wherein said seat further includes an engaging member attached to said seat back frame, wherein said first support wire further includes first and second hook portions formed into substantially U-shapes by bending end portions of said first and second arm portions, said first and second hook portions being suspended on and engaged with said engaging member, and first and second lock portions formed by bending free end portions of said first and second hook portions, and wherein said second support wire further includes third and fourth hook portions formed into substantially U-shapes by bending end portions of said third and fourth arm portions, said third and fourth hook portions being suspended on and engaged with said engaging member, and third and fourth lock portions formed by bending free end portions of said third and fourth hook portions, said first lock portion and said third lock portion being engaged and interlocked with each other, and said third lock portion and said fourth lock portion being engaged and interlocked with each other.

15. A seat provided with an air bag module according to claim 14, wherein said engaging member includes first and second valley portions, said first hook portion of said first support wire and said third hook portion of said second support wire being engaged with said first valley portion, and said second hook portion of said first support wire and said fourth hook portion of said second support wire being engaged with said second valley portion.

16. A seat provided with an air bag module according to claim 13, wherein said first and second lock portions of said first support wire extend laterally from said free end portions of said first and second hook portions, and wherein said third and fourth lock portions of said second support wire extend upwardly from said free end portions of said third and fourth hook portions.

17. A seat provided with an air bag module according to claim 14, wherein said first and second lock portions of said first support wire extend laterally from said free end portions of said first and second hook portions, and wherein said third and fourth lock portions of said second support wire extend upwardly from said free end portions of said third and fourth hook portions.

18. A seat provided with an air bag module according to claim 15, wherein said first and second lock portions of said first support wire extend laterally from said free end portions of said first and second hook portions, and wherein said third and fourth lock portions of said second support wire extend upwardly from said free end portions of said third and fourth hook portions.

19. A seat provided with an air bag module according to claim 13, wherein said first and second lock portions of said first support wire extend laterally from said free end portions of said first and second hook portions, wherein said free end portions of said third and fourth hook portions of said second support wire extend obliquely, and wherein said third and fourth lock portions of said second support wire are formed into substantially U-shapes and offset relative to said third and fourth arm portions of said second support wire.

20. A seat provided with an air bag module according to claim 14, wherein said first and second lock portions of said first support wire extend laterally from said free end portions of said first and second hook portions, wherein said free end portions of said third and fourth hook portions of said second support wire extend obliquely, and wherein said third and fourth lock portions of said second support wire are formed into substantially U-shapes and offset relative to said third and fourth arm portions of said second support wire.

21. A seat provided with an air bag module according to claim 15, wherein said first and second lock portions of said first support wire extend laterally from said free end portions of said first and second hook portions, wherein said free end portions of said third and fourth hook portions of said second support wire extend obliquely, and wherein said third and fourth lock portions of said second support wire are formed into substantially U-shapes and offset relative to said third and fourth arm portions of said second support wire.

* * * * *